Dec. 13, 1938.   N. D. LEVIN   2,139,834
PORTABLE LOADING MACHINE
Original Filed Sept. 16, 1931   2 Sheets-Sheet 2

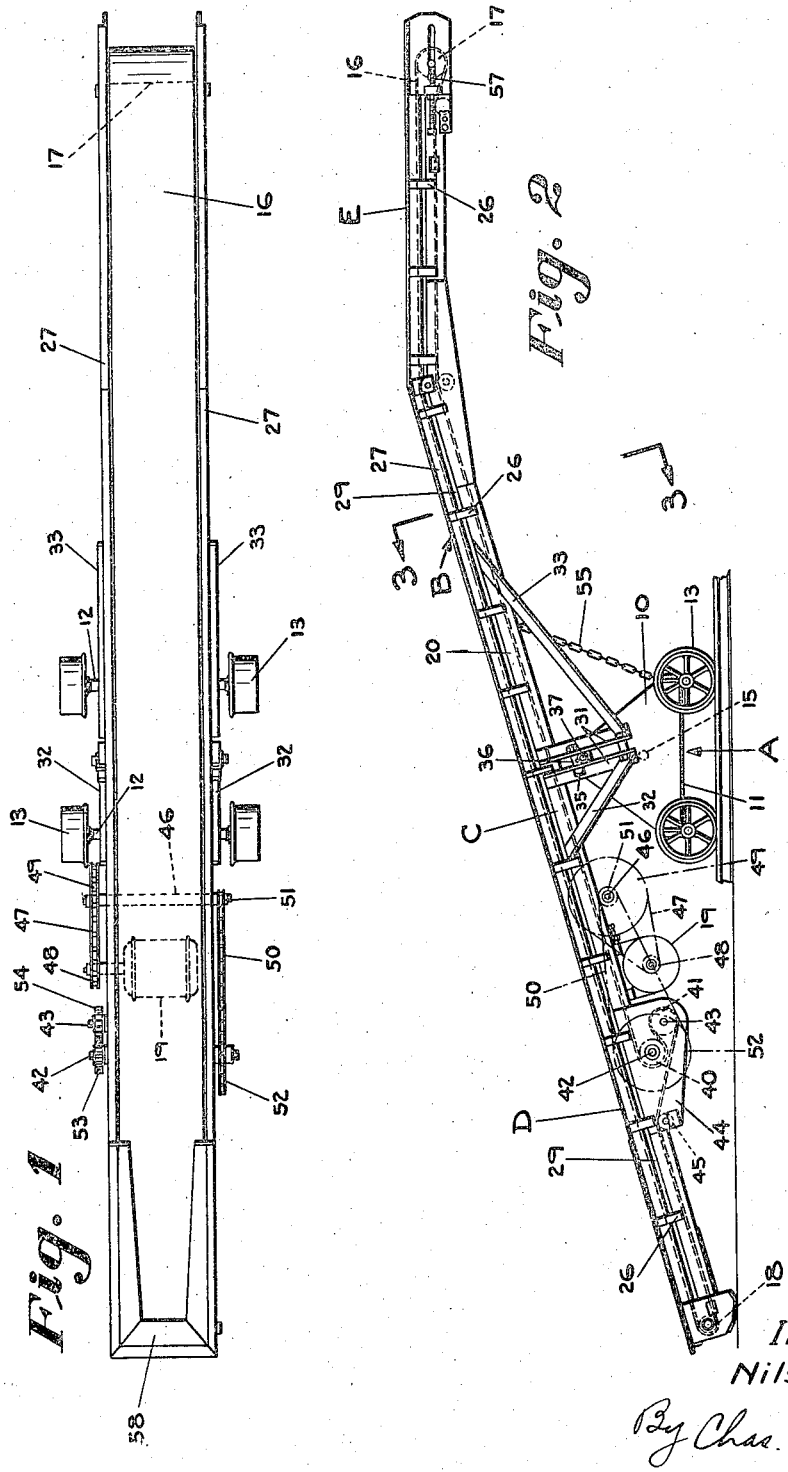

INVENTOR
Nils D. Levin.
By Chas. M. Nissen,
Atty.

Patented Dec. 13, 1938

2,139,834

UNITED STATES PATENT OFFICE 2,139,834

PORTABLE LOADING MACHINE

Nils D. Levin, Columbus, Ohio, assignor to The Jeffrey Manufacturing Company, Columbus, Ohio, a corporation of Ohio Application September 16, 1931, Serial No. 563,113
Renewed December 9, 1936

4 Claims. (Cl. 198—204)

My invention relates to portable loaders and one of its objects is to provide an improved and simplified supporting structure therefor.

A further object of the invention is the provision of improved and efficient means for affording lateral egress of material spilling off the conveyor mechanism.

Another object of the invention is the provision of lateral troughs for a conveyor bed or way and discharge openings communicating with said trough to effect ejection of spilled material laterally from the conveyor.

A further object of the invention is to provide means for lateral ejection of material spilled from the sides of a belt conveyor to prevent such spilled material from creeping under the belt.

Another object of the invention is to provide improved and efficient means for supporting the lower run of an endless conveyor element and prevent the same from sagging.

Another object of the invention is to provide improved mechanism for holding the conveyor at an adjusted inclination.

Other objects of the invention will appear hereinafter, the novel features and combinations being set forth in the claims hereto appended.

In the accompanying drawings,

Fig. 1 is a plan view of a portable loader embodying my improvements.

Fig. 2 is an elevation of the same.

The portable loader illustrated in Figs. 1 and 2 comprises a truck A and a conveyor B pivotally mounted on the truck A for swinging movement in vertical planes.

Figure 4:
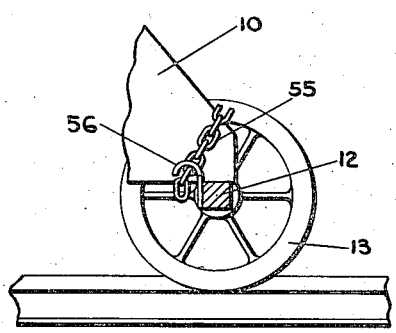
Fig. 4 is a detail view.

Truck A comprises two vertical spaced apart plates 10, 10 having at their lower ends outwardly extending horizontal flanges 11, 11 which are welded to the axles 12 which are square in cross-section as shown in Fig. 4. The axles 12 are provided with cylindrical ends on which are mounted for free rotation the truck wheels 13.

Stiffening or reinforcing plates 14 of triangular shape are welded along their horizontal and vertical edges to the squared axles 12 and the outer sides of the plates 10. These plates 14 brace the vertical plates 10 and add to the strength of the truck frame.

A tubular cross member 15 extends between the two plates 10 and is welded at its ends to said plates thus adding further to the rigidity of the truck frame. Notwithstanding the simplicity of construction of the truck frame it is of sufficient strength to afford ample support to the conveyor and withstand rough usage to which portable conveyors are subjected in practical operation.

The conveyor B comprises a longitudinally extending frame C having an inclined forward portion D and a horizontal rear portion E.

An endless belt 16 extends along the entire length of the frame C. A head pulley 17 is supported at the rear end of the conveyor frame and a foot pulley 18 is supported at the forward end thereof. An electric motor 19 is positioned below the forward portion D of the conveyor and is connected to the conveyor belt 16 to drive the same as hereinafter more fully explained.

Figure 3:
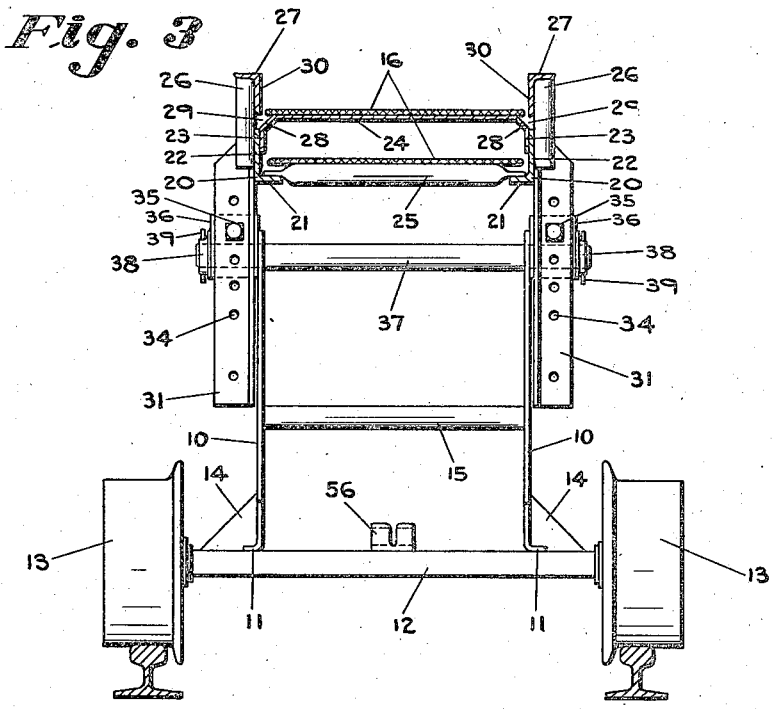
Fig. 3 is a sectional elevation taken on the line 3—3 of Fig. 2, looking in the direction of the arrows.

The conveyor frame comprises longitudinally extending angle irons 20, 20, spaced apart and located on opposite sides of the conveyor frame as shown in Fig. 3. Welded to the vertical flanges 22 of the angle irons 20 are downwardly extending flanges 23 of a belt supporting trough or bed plate 24. Transversely extending tubular cross members 25 are flattened at their ends and welded to the upper sides of the lower horizontal flanges 21 of the angle iron 20 to brace the conveyor frame and serving to support the lower run or strand of the belt 16. The cross members 25 being of tubular shape offer but little resistance to the propulsion of the belt and because of the smooth upper surfaces of the cross members 25 no undue wear of the belt will occur. Furthermore, sagging of the lower run or strand of the belt is prevented by the cross pieces 25 which are spaced apart or located at intervals between the ends of the conveyor.

Welded to the vertical flanges 22 of the angle irons 20 and extending upwardly therefrom are a plurality of tubular rods or tubes 26 which are spaced apart or located at intervals along the entire length of the conveyor frame as shown in Fig. 2. To the upper ends of the tubes 26 are welded the vertical flanges 30, 30 of the longitudinally extending angle irons 27, 27 which afford lateral guide plates for the edges of the upper run or strand of the belt 16.

It should be noted that the trough or bed plate 24 is beveled at 28, 28 to afford longitudinal spaces 29, 29 between the lower edges of the guide plates 30, 30 of the upper angles 27 and the upper edges of the flanges 22 of the angle irons 20.

When belts travel in troughs between guides there is a tendency for the material to spill off the edges of the belt and creep under the same, causing such abrasion as to effect excessive wear of the belt and the trough plates.

Since the tubes 26, 26 are secured to the vertical flanges 22 and 30 so as to hold them spaced apart, a longitudinal slot is produced along each side of the conveyor trough. It will therefore be seen that material which spills off the edges of the belt 16 has free egress into the longitudinal spaces 29 and laterally from these spaces through the slots which extend longitudinally of the conveyor frame as shown in Fig. 2. Therefore longitudinally extending lateral spillways are provided so that material spilling off the edges of the belt instead of creeping under the same will be ejected laterally along the beveled portions 28, 28 out through the longitudinal slots or lateral unobstructed passageways, thereby greatly reducing friction and wear.

It should also be noted that the vertical members 26 are circular in cross section and they do not obstruct the free passage of spilled material from the longitudinal spaces 29.

Two pairs of angle irons 31 are welded to the vertical flanges 22, 22 of the angle irons 20 at the sides of the conveyor frame C. The angle irons 31 extend downwardly from the frame C and are braced longitudinally of the conveyor frame by means of the angle irons 32 and 33.

The transverse flanges of the angle irons 31 are provided with vertical series of spaced apertures 34 through which are adapted to be passed the bolts 35, 35 which support the slide blocks 36, 36.

Journaled in aligned openings in the blocks 36 is a cross shaft 37 which is supported by the vertical truck plates 10 by extending through openings therein.

The outer ends of the shaft 37 are provided with washers 38 and cotter pins or keys 39 to prevent disengagement of the adjacent parts.

The bolts 35 extend through apertures in slide blocks 36 and therefore when the conveyor frame is adjusted in elevation it is supported on the slide blocks 36 and the shaft 37 against movement either up or down, but the conveyor is free to be tilted on the axis of the shaft 37.

The conveyor may be adjusted in elevation by removing the bolts 35 and inserting them in any selected aperture 34 in the angle irons 31.

The driving mechanism for the conveyor belt comprises a pair of pulleys 40, 41 mounted on shafts 42, 43 respectively which are supported in bearings fixed to the plates 44 attached to the angles 20 of the main conveyor frame. An idler pulley 45 guides the belt into the lower part of the forward portion of the conveyor frame.

Both pulleys 40, 41 are driven from the motor 19. A sprocket chain 47 is driven by sprocket 48 on the shaft of the armature of the electric motor 19. A sprocket chain 50 is driven by a sprocket 51 fixed to the shaft 46 and this sprocket chain 50 drives the sprocket 52 on the shaft 42.

By referring to Fig. 1 it will be seen that on that side of the conveyor opposite the sprocket chain 50 is located a pair of spur gears 53, 54 which are meshed with each other and respectively connected to the shafts 42 and 43. The pulley 41 is therefore driven in synchronism with the pulley 40 and the pulley 41 acts as a snub pulley to provide a more efficient drive for the conveyor belt 16.

It will be seen by referring to Fig. 2 that reduction gearing is located between the motor 19 and the shaft 46 and that further reduction gearing is located between the shaft 46 and the shaft 42, thereby providing for the use of the relatively high speed motor 19.

The motor 19 and the mechanism operated thereby for driving the belt 16 are located on the forward portion D of the conveyor frame C; therefore when the frame C is released it will tilt on the axis 37 to the position shown in Fig. 2. When the rear portion E of the conveyor is moved downwardly so as to elevate the forward portion D for traveling along a track or otherwise from place to place the conveyor frame may be held in such travel position by hooking the chain 55 to the curved clip 56 secured to the rear axle 12 as shown in Fig. 4. The upper end of the chain 55 is secured to one of the cross members 25.

A take-up mechanism may be provided as shown at 57 in Fig. 2 in accordance with standard practice to provide means for tensioning the conveyor belt or removing the slack therefrom when desirable.

A hopper 58 at the receiving end of the conveyor permits loading from a car hopper or otherwise without the tendency for any great amount of material moving to the sides of the belt and finding egress through the lateral slots at 29, 29; that is to say, the hopper 58 is so shaped as to permit efficient loading of the belt conveyor by directing the material onto almost the entire width thereof, but sufficiently limiting the loading of the belt near the edges to minimize the spilling of the material over the edges of the belt.

In explanation of the terminology used in the claims hereto appended, it should be understood that in the drawings illustrating one embodiment of the invention defined by these claims, the conveyor trough comprises a bed between the spaced side walls 30, 30, the bed being the bottom of the trough or the upper flat surface of the bed plate 24 between the beveled portions 28, 28, along which bed the conveyor belt 16 slides. In other words the upper run of the belt 16 slides along the bed between the side walls 30, 30. The structure shown adjacent to the elongated openings at 29, 29, constitutes means for affording discharge from the edges of the bed, of material spilling over the edges of the belt, to prevent such spilled material from creeping under the belt.

The side walls 30, 30 are formed by the inner opposing surfaces of the vertical plates of the elongated angle iron strip 27, 27 which are so held up by the vertical spaced supports 26, 26 as to provide elongated discharge slots immediately below the side walls. By means of the bevels at 28, 28 elongated openings are provided at the edges of the bed immediately below the edges of the belt and such elongated openings are in direct communication or merge into the elongated discharge slots. It is this arrangement that prevents the spilled over material from creeping under the belt while at the same time such material is prevented from spilling onto the upper surface of the lower run of the belt.

By referring to Fig. 3 it will be seen that the bed along which the upper run of the belt slides has beveled portions at 28, 28. The conveyor belt is slidable along this bed with the edges of the belt above the bevels 28, 28 and closely adjacent thereto. By the provision of the elongated angle iron side strips 22, 22 in spaced relation to the upper elongated angle iron strips 27, 27, and in connection with the bevels 28, 28, the elongated side discharge slots are so located as to direct the spilled material laterally from the conveyor frame. That is to say, material spilled off the edges of the belt onto the bevels 28, 28 will be laterally discharged from the elongated side discharge slots.

In the specific construction illustrated in Fig. 3, a plate integral throughout, is bent to form a shallow inverted U-shape to provide a relatively wide bed plate beveled at its edges to form elongated lateral relatively narrow deflectors 28, 28. The edges of the belt are in close proximity to and above these narrow deflectors. The longitudinal angle irons 20, 20 each has a vertical member 22 and an inwardly extending ledge 21. The plate 24 is beveled at 28, 28 and is provided with the vertical flanges 23, 23 which are secured to the vertical members 22, 22. The edges of the bed on which the conveyor belt 16 slides are spaced from the lower edges of the vertical members of the angle irons 27, 27, to form elongated openings at the sides of the trough, in communication over the deflectors 28, 28 with the side elongated discharge slots. It will be seen that, since the support for the upper run of the conveyor belt is relatively wide, while the edges of the belt are closely adjacent to the relatively narrow elongated deflectors, in close proximity to the elongated openings through which spilled over material moves, no material can creep under the belt and no material can fall onto the upper surface of the under run of the belt. Consequently abrasive granular material may be handled by the loader without injuring the belt or the surface on which it slides, thereby prolonging the life of both the conveyor belt and the bed on which it slides.

Inasmuch as the downwardly and laterally inclined deflectors 28, 28 extend along the whole conveyor frame, and so also the elongated side discharge slots, the material that spills off the edges of the belt may be discharged through said slots anywhere along the conveyor frame. Consequently the deflectors 28, 28 act as downwardly and laterally directed chutes at the edges of the bed along which the upper run of the belt slides. The longitudinal side discharge slots are located at the sides of the conveyor frame at the lower edges of such side chutes.

It should also be noted that the longitudinal strips 20, 20 at the sides of the frame, are secured to the narrow deflectors 28, 28, as shown in Fig. 3, and these strips 20, 20 have inwardly projecting horizontal supports 21, 21 to which are secured the flattened ends of the spaced apart members 25 each of which is circular in cross section. The upper run of the conveyor belt 16 is adapted to slide along the upper surface of the bed plate 24 while the lower run of the belt 16 is supported by the spaced members 25 to prevent such lower run from sagging. Since the members 25 are circular in cross section they have upper curved surfaces to reduce the friction of the sliding thereover of the lower run of the belt.

Obviously those skilled in the art may make various changes in the details and arrangement of parts without departing from the spirit and scope of the invention as defined by the claims hereto appended and I wish therefore not to be restricted to the precise construction herein disclosed.

Having thus shown and described an embodiment of my invention what I desire to secure by Letters Patent of the United States is:

1. In a conveyor, the combination of a conveyor frame having a relatively wide bed plate with relatively narrow laterally inclined deflectors at the edges of said bed plate adjacent to the sides of said frame, longitudinal strips at the sides of said frame and secured to said narrow deflectors, said strips having inwardly projecting horizontal supports, spaced-apart members circular in cross-section and having flattened ends secured to said inwardly projecting horizontal supports in position to be spaced below said bed plate, and an endless conveyor belt with its upper run adapted to slide along the upper surface of said bed plate and its lower run supported by said spaced members to prevent the belt from sagging.

2. In a conveyor, the combination of a conveyor frame having a relatively wide bed plate with relatively narrow laterally and downwardly inclined deflectors at the edges of said bed plate adjacent to the sides of said frame, longitudinal angle iron strips at the sides of said frame and each comprising a vertical member and an inwardly extending ledge, spaced-apart members curved in cross-section on their upper sides and having their ends secured to said ledges, vertical longitudinal strips connecting said deflectors to said vertical members, an endless conveyor belt with its upper run adapted to slide along the upper surface of said bed plate with the edges of the belt closely adjacent to said deflectors and with the lower run adapted to slide over the curved surfaces of said spaced-apart members between said angle iron strips, and means for operating said conveyor belt.

3. In conveyor apparatus, the combination with a supporting frame comprising longitudinal angle irons each having a vertical member and an inwardly extending ledge, of an integral plate bent to form a relatively wide bed plate with relatively narrow elongated deflectors at its edges connected to vertical flanges secured to said vertical members, additional longitudinal angle irons each having a vertical member to form spaced-apart side walls of a trough in cooperation with said bed plate, and means for supporting said second-named angle irons on said first-named vertical members in spaced relation therewith to form elongated discharge slots at the sides of said frame in close proximity to said deflectors and for supporting the second-named angle irons with their lower edges in spaced relation to the edges of said bed plate to form elongated openings at the sides of said trough in communication over said deflectors with said elongated slots.

4. In a conveyor, the combination with a supporting frame comprising vertical spaced-apart side plates, of a relatively wide flat bed plate comprising a bed with lateral downwardly and outwardly inclined extensions from the edges of said bed closely adjacent to said sides plates, means for securing said extensions to said side plates with the upper edges of the latter at the lower edges of said extensions, additional side plates adapted to provide inner walls of a trough having said bed plate as its bottom, and means for mounting on said frame said additional side plates with the lower edges thereof spaced laterally from the edges of said bed and vertically from the lower edges of said extensions and at right angles to the planes of said extensions.

NILS D. LEVIN.